US008514971B2

(12) United States Patent
Higuchi et al.

(10) Patent No.: US 8,514,971 B2
(45) Date of Patent: Aug. 20, 2013

(54) BASE STATION APPARATUS AND METHOD IN MOBILE COMMUNICATION SYSTEM (75) Inventors: Kenichi Higuchi, Yokohama (JP); Yoshihisa Kishiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 896 days.

(21) Appl. No.: 12/531,816

(22) PCT Filed: Mar. 14, 2008

(86) PCT No.: PCT/JP2008/054787
§ 371 (c)(1),
(2), (4) Date: Jan. 8, 2010

(87) PCT Pub. No.: WO2008/114743
PCT Pub. Date: Sep. 25, 2008

(65) Prior Publication Data
US 2010/0316156 A1    Dec. 16, 2010

(30) Foreign Application Priority Data

Mar. 20, 2007  (JP) ................................ 2007-073727

(51) Int. Cl.
*H04L 25/49* (2006.01)
(52) U.S. Cl.
USPC ............................ 375/296; 375/267; 375/285
(58) Field of Classification Search
USPC ........................ 375/221, 267, 285, 316, 295
See application file for complete search history.

(56) References Cited

U.S. PATENT DOCUMENTS

| 7,224,744 B2 * | 5/2007 | Giannakis et al. ............ 375/267 |
| 2008/0008110 A1 | 1/2008 | Kishigami et al. |
| 2010/0008445 A1 * | 1/2010 | Khan ............................. 375/296 |
| 2010/0046432 A1 * | 2/2010 | Chang et al. .................. 370/328 |

FOREIGN PATENT DOCUMENTS

| EP | 1 865 642 A1 | 12/2007 |
| EP | 1 898 542 A1 | 3/2008 |
| JP | 2006-238292 A | 9/2006 |
| WO | 2005/114874 A1 | 12/2005 |
| WO | 2006/106613 A1 | 10/2006 |
| WO | 2006/134949 A1 | 12/2006 |

OTHER PUBLICATIONS

3GPP TSG RAN WG Meeting #47bis, R1-070103, Sorrento, Italy, Jan. 15-19, 2007, "Downlink L1/L2 Control Signaling Channel Structure: Coding".
International Search Report for PCT/JP2008/054787 mailed May 27, 2008 (9 pages).
Written Opinion of ISA mailed May 27, 2008 (4 pages).
Patent Abstracts of Japan 2006-238292 dated Sep. 7, 2006 (41 pages).
3GPP TR 25.814 V7.0.0(Jun. 2006) 3rd Generation Partnership Project; Technical Specification Group Radio Access Network; Physical Layer Aspects for Evolved Universal Terrestrial Radio Access (UTRA) Release 7 (126 pages).

* cited by examiner

*Primary Examiner* — Sam K Ahn
*Assistant Examiner* — Janice Tieu
(74) *Attorney, Agent, or Firm* — Osha • Liang LLP (57) ABSTRACT A base station apparatus used in a mobile communication system where user terminals with various numbers of reception antennas may be situated includes a providing unit configured to provide plural reference signals according to the number of transmission antennas; a precoding unit configured to replicate each of a predetermined number of input signal sequences according to the number of transmission antennas, apply a predetermined precoding vector to each of the replicated sequences, and generate output signal sequences corresponding to the number of transmission antennas; and a transmitting unit configured to transmit transmission signals including the output signal sequences from plural transmission antennas; wherein at least one of the input signal sequences includes a control signal and one of the plural reference signals.

6 Claims, 7 Drawing Sheets

BASE STATION APPARATUS AND METHOD IN MOBILE COMMUNICATION SYSTEM

TECHNICAL FIELD

The present invention relates to a base station apparatus and a method in a mobile communication system.

BACKGROUND ART

Research and development regarding next generation mobile communication systems has been proceeding in this technical field. The W-CDMA (Wideband Code Division Multiple Access) standardization organization 3GPP (3rd Generation Partnership Project) has been discussing a communication system called Long Term Evolution (LTE) as a successor of W-CDMA, HSDPA (High Speed Downlink Packet Access), and HSUPA (High Speed Uplink Packet Access). As a radio access scheme in LTE, Orthogonal Frequency Division Multiplexing (OFDM) is under consideration for downlink, and Single-Carrier Frequency Division Multiple Access (SC-FDMA) is under consideration for uplink (see 3GPP TR 25.814 (V7.0.0), "Physical Layer Aspects for Evolved UTRA", June 2006, for example).

In OFDM, a frequency band is divided into plural narrow frequency bands (sub-carriers), and data are placed on the respective divided frequency bands to carry out transmission. The sub-carriers are densely arranged in a frequency direction, allowing the sub-carriers to be partly overlapped without causing interference, thereby realizing high speed transmission and improving frequency usage efficiency.

In SC-FDMA, a frequency band is divided into plural narrow bands, and different narrow bands are used by different user terminals, so that interference between the user terminals can be reduced. According to SC-FDMA, which is characterized in that variations in the transmission power are reduced, a large coverage area and low energy consumption in the user terminal can be realized.

In LTE, one or more physical channels for both uplink and downlink are shared by plural user terminals (plural sets of user equipment). The channel which is shared by plural user terminals is typically called a shared channel. In LTE, a Physical Uplink Shared Channel (PUSCH) is used as a shared channel for uplink and a Physical Downlink Shared Channel (PDSCH) is used as a shared channel for downlink.

In a communication system using these shared channels, the base station apparatus needs to signal information about user terminals to which the shared channel is allocated for each sub-frame (1 ms in LTE). A control channel used for this signaling is called a Physical Downlink Control Channel (PDCCH) or a Downlink L1/L2 Control Channel (DL-L1/L2 Control Channel). Information on the PDCCH includes downlink scheduling information, acknowledge information (ACK/NACK), an uplink scheduling grant, an overload indicator, a transmission power control command bit, and so on, for example (see 3GPP,R1-070103, "Downlink L1/L2 Control Signaling Channel Structure", for example).

The downlink scheduling information and the uplink scheduling grant correspond to the information about user terminals to which the shared channel is allocated. The downlink scheduling information includes allocation information for downlink resource blocks (RBs) on the downlink shared channel, a user equipment identification (UE ID), the number of streams for MIMO (Multiple Input and Multiple Output) transmission, information about a precoding vector, a data size, a modulation scheme, information about hybrid automatic repeat request (HARQ), and so on, for example. The uplink scheduling grant includes allocation information for uplink resources on the uplink shared channel, a UE ID, a data size, a modulation scheme, information about uplink transmission power, information about a demodulation reference signal for uplink MIMO transmission, and so on, for example.

DISCLOSURE OF INVENTION

Problem(s) to be Solved by the Invention

An MIMO (Multiple Input and Multiple Output) system is a multi-antenna based communication system in which high speed and/or high quality signal transmission can be achieved with the use of plural antennas for communications. In the MIMO system, how to process signals typically varies depending upon the number of antennas used for communications. In the currently-proposed next generation mobile communication system, it is assumed that the base station apparatus transmits signals with one antenna, two antennas, or four antennas and receives signals with two antennas or four antennas. It is also assumed that the user terminal transmits signals with one antenna or two antennas and receives signals with two antennas or four antennas. In a future mobile communication system, plural combinations of antennas may be used for communications in the user terminal and the base station apparatus. When the base station apparatus transmits different signals from four antennas and the user terminal can use only two antennas, the user terminal may not appropriately demodulate downlink signals. In order to solve this problem, it is possible for the base station apparatus to transmit the downlink control channel (downlink control signals) only with two antennas. In addition, the user terminal needs to receive the synchronization channel (synchronization channel signals) regardless of the number of transmission antennas in the base station apparatus, because the user terminal has to appropriately receive the synchronization channel before receiving the control channel (control signals) or the like. For this reason, it is possible for the base station apparatus to transmit the synchronization channel with one antenna.

Figure 1:
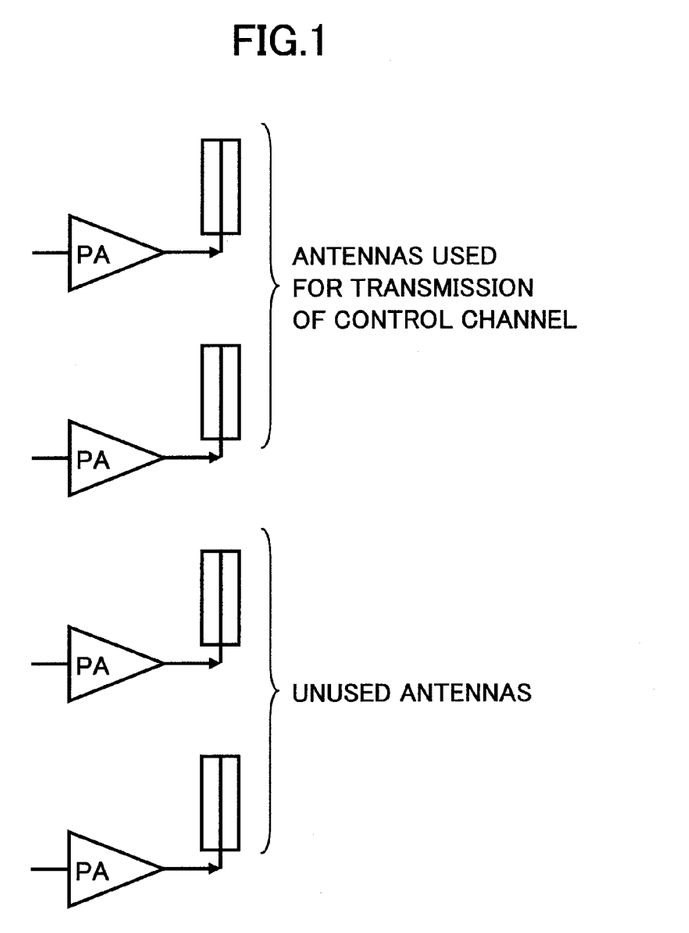
FIG. 1 shows an example where some of plural antennas remain unused.

When the base station apparatus transmits the control channel or the synchronization channel only with one or two transmission antennas among plural transmission antennas, any user terminal may appropriately receive these signals. However, antennas which are not used for the control channel and the synchronization channel remain unused as shown in FIG. 1. Accordingly, power resources assigned to the unused antennas may not be effectively used. In addition, when signals are transmitted only with some of plural transmission antennas, the space diversity effect in the MIMO system may not be sufficiently produced.

It is a general object of the present invention to effectively use power resources in the base station apparatus, when plural combinations of antennas may be used for communications in the user terminal and the base station apparatus.

Means for Solving the Problem(s)

In one aspect of the present invention, there is provided a base station apparatus used in a mobile communication system where user terminals with various numbers of reception antennas may be situated, including:

a providing unit configured to provide plural reference signals according to the number of transmission antennas;

a precoding unit configured to replicate each of a predetermined number of input signal sequences according to the number of transmission antennas, apply a predetermined precoding vector to each of the replicated sequences, and generate output signal sequences corresponding to the number of transmission antennas; and a transmitting unit configured to transmit transmission signals including the output signal sequences from plural of the transmission antennas; wherein at least one of the input signal sequences includes a control signal and one of the plural reference signals.

Advantageous Effect of the Invention

According to an embodiment of the present invention, it is possible to effectively use power resources in the base station apparatus, when plural combinations of antennas may be used for communications in the user terminal and the base station apparatus.

DETAILED DESCRIPTION OF THE PREFERRED EMBODIMENTS

Description of Notations

PA power amplifier
31, . . . , 34 weighting and replicating unit
312, . . . , 342 replicating unit
314, . . . , 344 precoding vector determining unit
316, . . . , 346 multiplying unit
318, . . . , 348 combining unit
61 transmission diversity modulation unit
62 adaptive precoding unit
63-1, . . . , 63-4 multiplexing unit
64 synchronization channel switch
65-1, . . . , 65-1 multiplexing unit
66 fixed precoding unit

BEST MODE OF CARRYING OUT THE INVENTION

Figure 2:
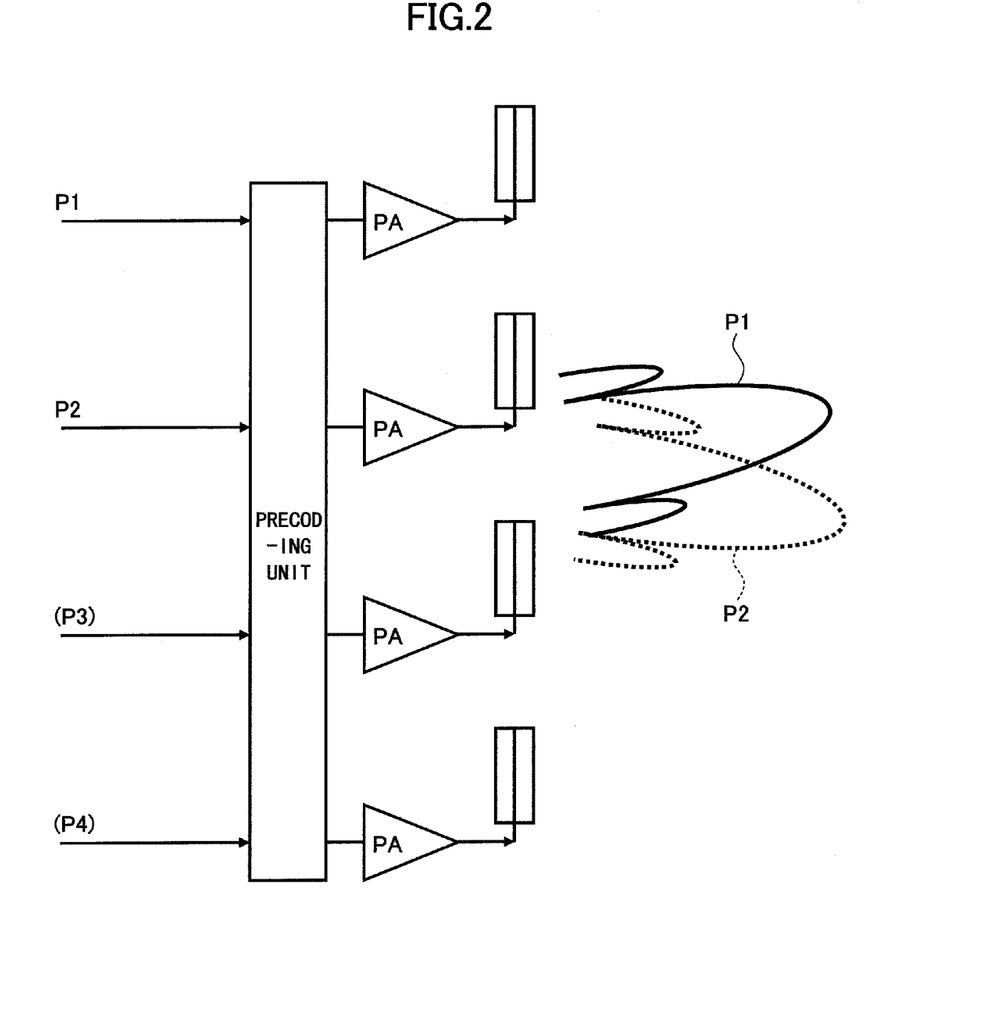
FIG. 2 shows an example where reference signals are transmitted from a base station apparatus.

FIG. 2 shows an example where reference signals are transmitted from a base station apparatus according to an embodiment of the present invention. The base station apparatus includes four transmission antennas, each of which includes a power amplifier PA. A signal sequence supplied to each power amplifier PA corresponds to an output signal sequence from a precoding unit. Reference signals P1 and P2 are supplied as input signals to the precoding unit. Reference signals P3 and P4 can be received by a user terminal (user equipment) with four antennas. Accordingly, these reference signals P3 and P4 are used for communications with four antennas. Preferably, reference signals P1, P2, P3, and P4 are mutually orthogonal signal sequences.

Figure 3:
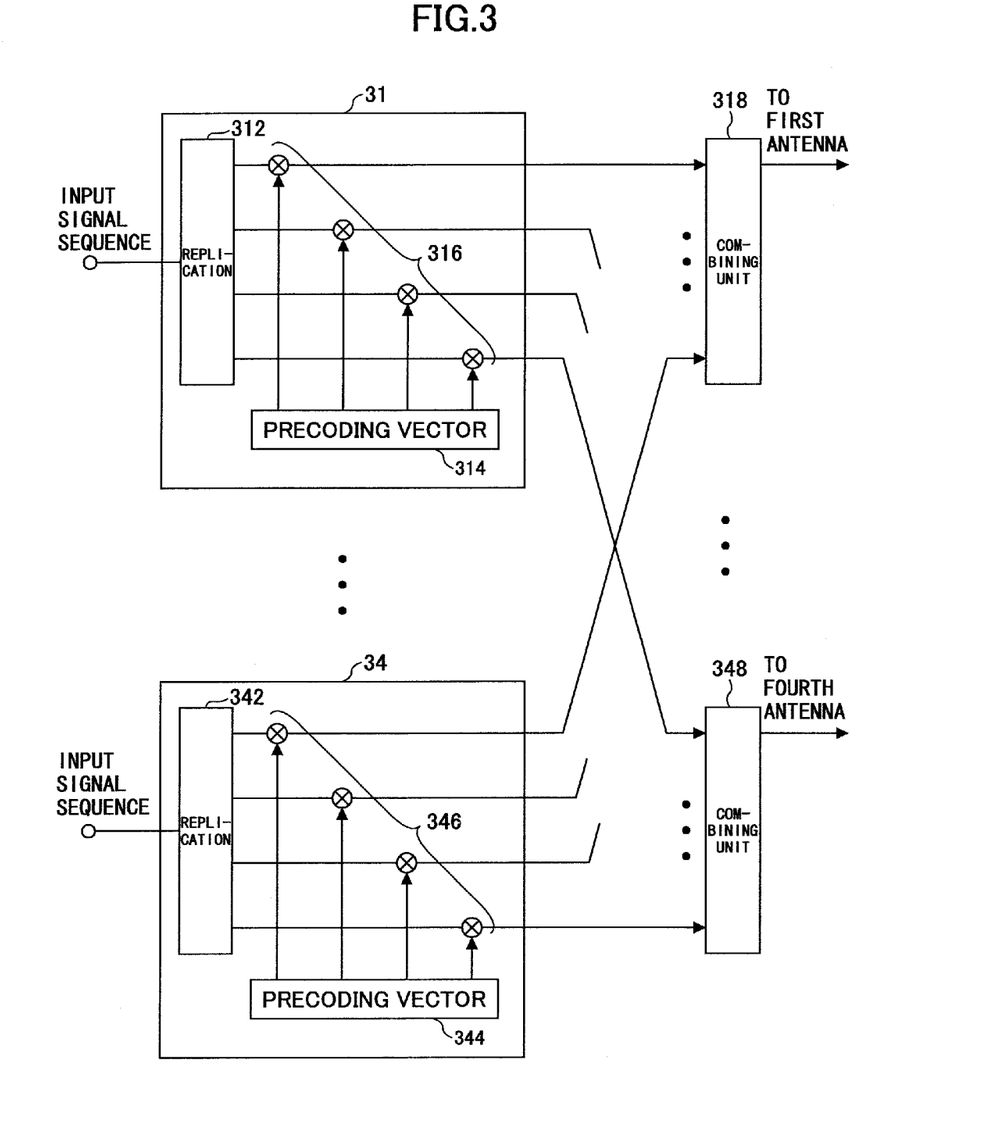
FIG. 3 shows a block diagram of a precoding unit.

FIG. 3 shows the precoding unit in detail. As shown in FIG. 3, the precoding unit includes first through fourth weighting and replicating units 31, . . . , 34 and first through fourth combining units 318, . . . , 348. The first weighting and replicating unit 31 includes a replicating unit 312, a precoding vector determining unit 314, and a multiplying unit 316. The other weighting and replicating units include similar units. The input signal sequence is replicated by (according to) the number of transmission antennas, and then a precoding vector is applied to each of the replicated sequences. Each of the sequences to which the weight with the precoding vector is applied is supplied to the combining unit for the corresponding antenna. The combining unit combines sequences which are replicated from various input signal sequences and to which weights are applied, and then supplies the combined sequences to the power amplifier PA.

According to the example shown in FIGS. 2 and 3, the reference signals P1 and P2 are always transmitted. On the other hand, the reference signals P3 and P4 are transmitted only if needed. When only the reference signals P1 and P2 are transmitted, the reference signals P1 and P2 are added to the first and second input signal sequences among the first through fourth input signal sequences and useful signals in terms of reference signals are not added to the third and fourth input signal sequences. The first reference signal P1 added to the first input signal sequence is replicated by the replicating unit into four sequences, the weight with the first precoding vector is applied to the four sequences, and then the four sequences are distributed to the first through fourth antennas. In a similar manner, the second reference signal P2 added to the second input signal sequence is replicated by the replicating unit into four sequences, the weight with the second precoding vector is applied to the four sequences, and then the four sequences are distributed to the first through fourth antennas. Consequently, the weight with the first precoding vector is applied to the first reference signal, which is then transmitted to the user terminal from four antennas by means of a first directivity (a first beam). In the present embodiment, one directional beam is transmitted from four physical antennas with a single precoding vector. This directional beam corresponds to one virtual antenna. Accordingly, it can be expressed in such a way that "the first reference signal is transmitted from one virtual antenna". The weight with the second precoding vector is applied to the second reference signal, which is then transmitted to the user terminal from four antennas by means of a second directivity (a second beam). Accordingly, it can be expressed in such a way that "the second reference signal is transmitted from another virtual antenna". Since the first and second reference signals are transmitted from four physical antennas, power resources for the four physical antennas can be effectively used. Also, since all of the four physical antennas are used, the space diversity effect in the MIMO system can be sufficiently produced. From the view point of the user terminal, the first reference signal is received from one virtual antenna and the second reference signal is received from another virtual antenna. Accordingly, the user terminal can receive reference signals as if the reference signals are transmitted with two antennas regardless of the number of physical antennas in the base station apparatus.

Figure 4:
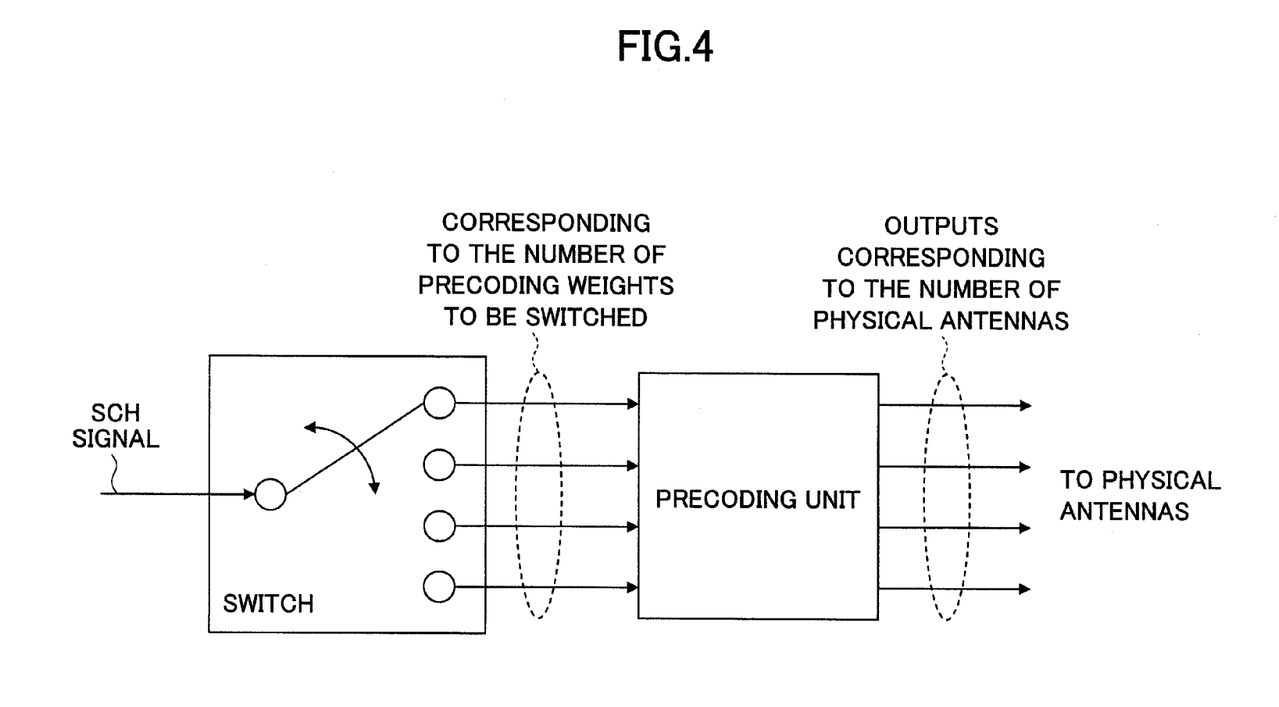
FIG. 4 shows an example where a synchronization channel is transmitted from a base station apparatus.

FIG. 4 shows an example where a synchronization channel (SCH) is transmitted from the base station apparatus. The synchronization channel (signal) is added to one of the input signal sequences in the precoding unit. The input signal sequence to which the synchronization channel is added varies by changing a switch. The precoding unit has the same structure and function as the precoding unit shown in FIG. 3. In this example, the synchronization channel is added to one of the input signal sequences and useful signals in terms of the synchronization channel are not added to the remaining three input signal sequences. Accordingly, the weight with the precoding vector is applied to the synchronization channel, which is then transmitted to the user terminal from four antennas by means of a certain directivity (a certain beam). The directivity changes when the input signal sequence to which the synchronization channel is added is switched.

Figure 5:
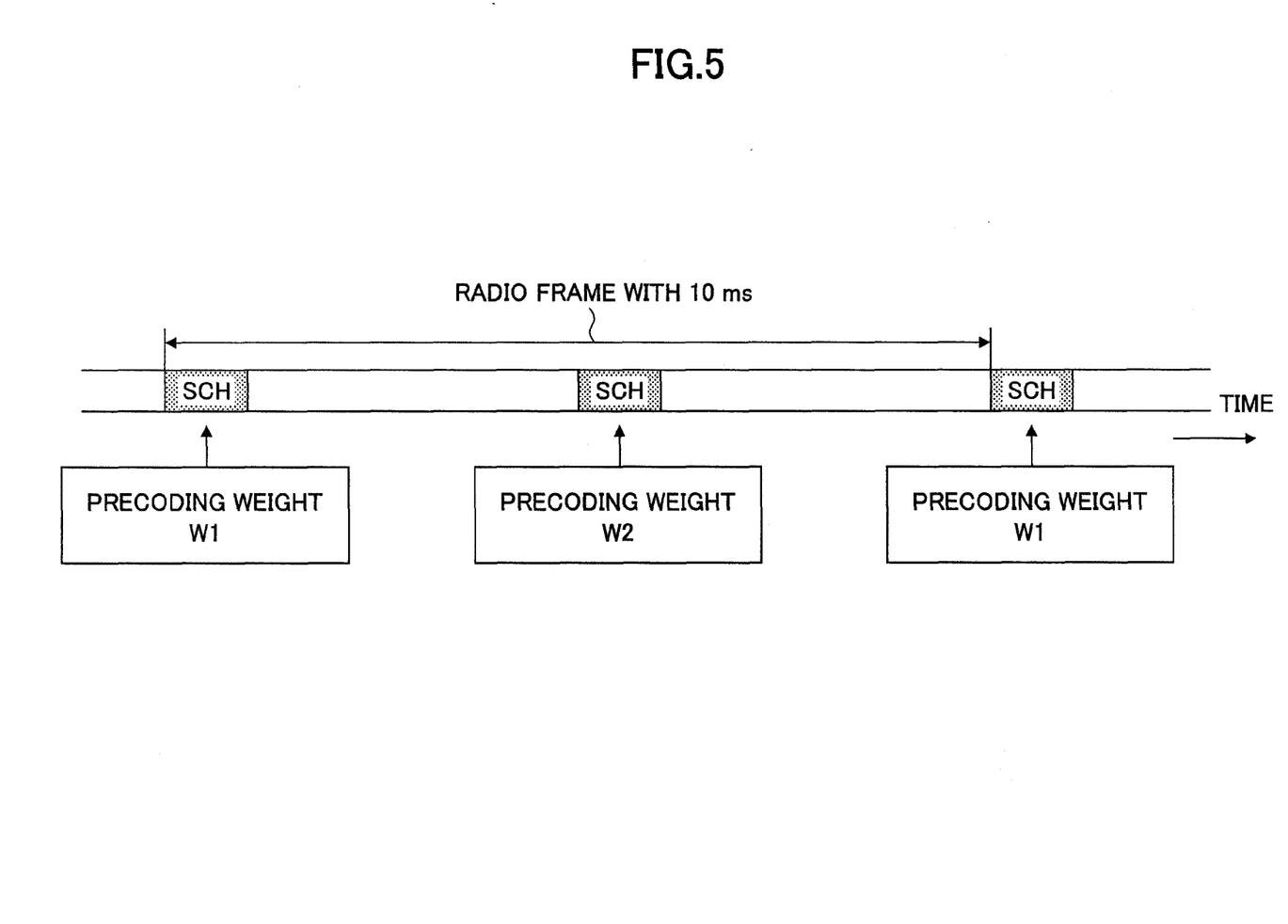
FIG. 5 shows an example where precoding vectors w1 and w2 for a synchronization channel are switched during every 10 ms.

FIG. 5 shows an example where precoding vectors w1 and w2 for a synchronization channel are provided and switched during every 10 ms. Since the synchronization channel is transmitted from four antennas, power resources for the four physical antennas can be effectively used. Also, since all of the four physical antennas are used, the space diversity effect in the MIMO system can be sufficiently produced. In the present embodiment, one directional beam is transmitted from four physical antennas with a single precoding vector. This directional beam corresponds to one virtual antenna. Although the beam for the synchronization channel changes each time the precoding vectors are switched, there exists only one beam at a given point in time. The user terminal receives the synchronization channel from only one virtual antenna. Accordingly, the user terminal can receive the synchronization channel as if the synchronization channel is transmitted with one antenna regardless of the number of physical antennas in the base station apparatus.

Figure 6:
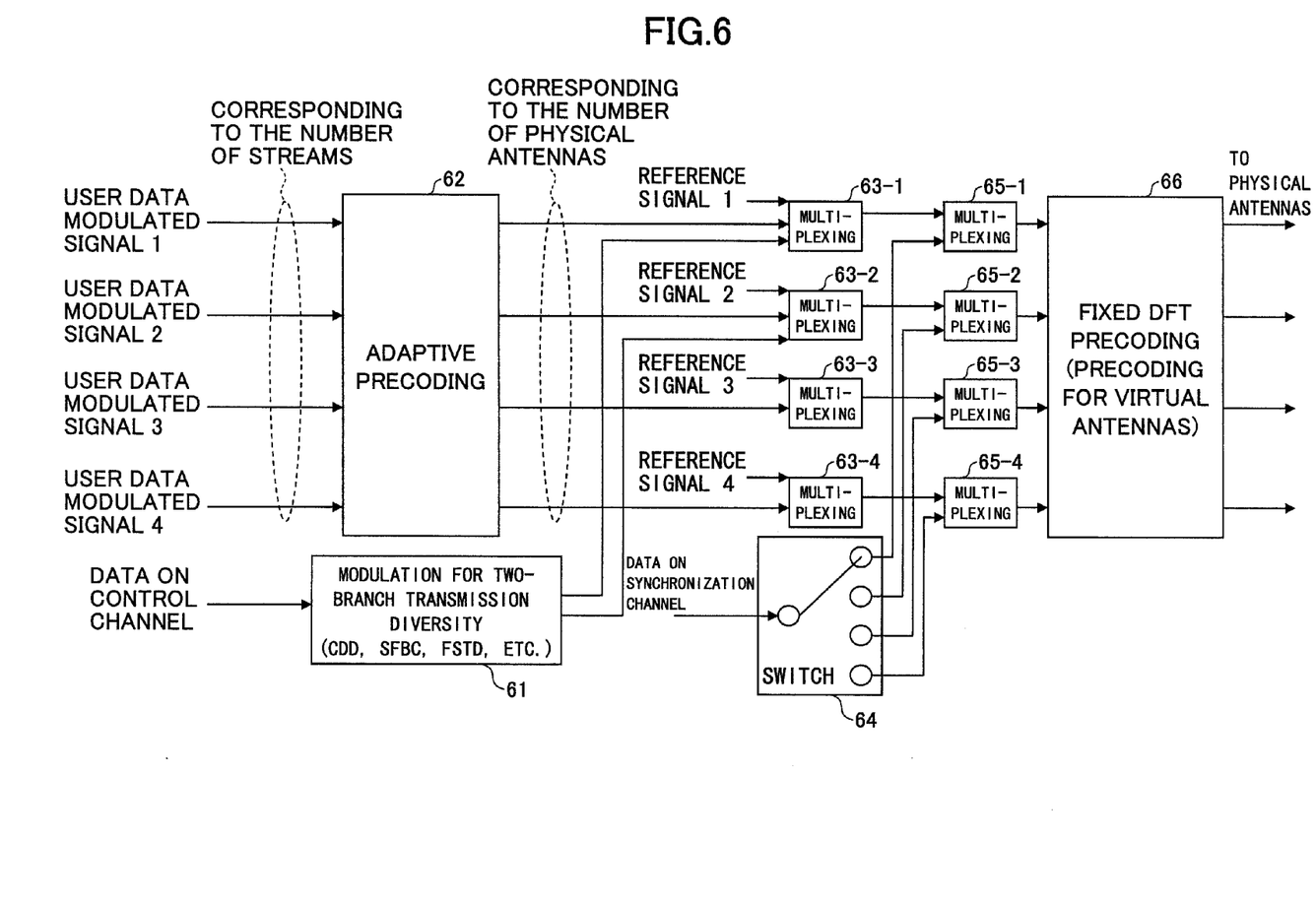
FIG. 6 shows an example where reference signals, a synchronization channel, a control channel, and user data are transmitted from the base station apparatus.

FIG. 6 shows an example where reference signals, a synchronization channel, a control channel, and user data are transmitted from the base station apparatus. A transmission diversity modulation unit 61, an adaptive precoding unit 62, multiplexing units 63-1, ..., 63-4, a synchronization channel switch 64, multiplexing units 65-1, ..., 65-4, and a fixed precoding unit 66 are shown in FIG. 6.

The transmission diversity modulation unit 61 converts a signal sequence on the control channel into plural signal sequences for transmission diversity. The modulation scheme for transmission diversity may be a Cyclic Delay Diversity (CDD) scheme, a Frequency Switched Transmit Diversity (FSTD) scheme, a Space Frequency Block Coding (SFBC) scheme, a Space Time Block Coding (STBC) scheme, or any other appropriate modulation scheme. In the shown example, one sequence on the control channel is converted into two sequences, since the control channel is transmitted from two virtual antennas. It should be noted that one sequence on the control channel may be converted into more than two sequences. As described above, one directional beam is transmitted from four physical antennas with a single precoding vector. This directional beam corresponds to one virtual antenna. Although the control channel is transmitted from the base station apparatus with four physical antennas, the user terminal can assume that the control channel is transmitted from two virtual antennas. Accordingly, the user terminal can receive the control channel as if it is transmitted with two antennas. Thus, the number of sequences into which the control channel is converted by the transmission diversity modulation unit 61 may be determined based on the number of virtual antennas. Alternatively, transmission diversity may not be performed and the control signal sequence on the control channel may not be converted into plural sequences. In this case, the control channel is transmitted from one virtual antenna.

The adaptive precoding unit 62 generally includes the same structure as the precoding unit described with reference to FIG. 3. In the adaptive precoding unit 62, input signal sequences on the data channel are replicated according to the number of physical transmission antennas, and then the precoding vector is applied to each of the replicated sequences. In the shown example, user data which are modulated according to 16QAM or the like are input as the input signal sequences on the data channel. Each of the sequences to which the weight with the precoding vector is applied is supplied to the combining unit for the corresponding antenna. The combining unit combines sequences which are replicated from various input signal sequences and to which weights are applied, and then supplies the combined sequences to next components (the multiplexing units 63-1, ..., 63-4 in FIG. 6). The precoding vector used in the adaptive precoding unit 62 is different from the precoding vector as described with reference to FIG. 3, in that the precoding vector is adaptively updated based on a feedback signal from the user terminal so as to be suitable for communications with the user terminal. As described below, a predetermined precoding vector is also applied to the data channel by the fixed precoding unit 66, and thus, both the adaptive precoding vector in the adaptive precoding unit 62 and the predetermined precoding vector in the fixed precoding unit 66 are applied to user data. Accordingly, adaptive control is performed so as to be suitable for communications with the user terminal, when both of the precoding vectors are applied to the data channel.

The multiplexing unit 63-1 multiplexes the reference signal 1, one sequence on the control channel, and the data channel (user data). The multiplexing unit 63-2 multiplexes the reference signal 2, the other sequence on the control channel, and the data channel (user data). The multiplexing unit 63-3 multiplexes the reference signal 3 and the data channel (user data) without multiplexing the sequence on the control channel. The multiplexing unit 63-4 multiplexes the reference signal 4 and the data channel (user data) without multiplexing the sequence on the control channel. Preferably, the reference signals 1, 2, 3, and 4 are mutually orthogonal. The reference signals 1 and 2 are essential for all user terminals, while the reference signals 3 and 4 are not essential. The reference signals 3 and 4 are used when the user terminal performs communications with four antennas. The reference signals 3 and 4 are multiplexed in the multiplexing units 63-3 and 63-4 when communications with the user terminal with four antennas are needed. Since the reference signals 3 and 4 are multiplexed if needed, resources for four reference signals need not be always reserved. Although resources for the reference signals 1 and 2 are always reserved, resources for the reference signals 3 and 4 may be optionally reserved if needed.

The synchronization channel switch 64 selectively combines the control channel and one of plural signal sequences, as descried with reference to the switch in FIG. 4.

The multiplexing units 65-1, ..., 65-4 multiplex output signals from the multiplexing units 63-1, ..., 63-4 and signals from the switch 64. One of the signals from the switch 64 includes the synchronization channel, while the others do not include useful signals. To which multiplexing unit the synchronization channel is supplied is controlled by the switch 64. For convenience of explanation, FIG. 6 shows that the multiplexing units 63-1, ..., 63-4 and multiplexing units 65-1, ..., 65-4 are separately provided. This is not essential for the present invention and alternatively the multiplexing units 63-1, ..., 63-4 and multiplexing units 65-1, ..., 65-4 may be combined. The combined signals have only to be supplied to the fixed precoding unit 66.

The fixed precoding unit 66 generally includes the same structure as the precoding unit described with reference to FIG. 3. In the fixed precoding unit 66, input signal sequences which are output from the multiplexing units 65-1, . . . , 65-4 are respectively replicated according to the number of physical transmission antennas, and then a predetermined precoding vector is applied to each of the replicated sequences. The predetermined precoding vectors for the reference signals, the synchronization channel, and the control channel are provided in advance either in the system or in each cell. Each of the predetermined precoding vectors has a weight which is determined independently of the individual user terminal. The number of predetermined precoding vectors provided in the fixed precoding unit 66 defines the number of virtual antennas. In the shown example, the reference signals which are used in common by all user terminals are transmitted from two virtual antennas, the synchronization channel is transmitted from one virtual antenna, the control channel is transmitted from two virtual antennas (the control channel is transmitted from one virtual antenna when the modulation scheme for transmission diversity is not employed), and the data channel is transmitted from antennas, the number of which are determined according to user terminals. Thus, the user terminal can measure CQI (reception quality of the downlink reference signal) or the like, in consideration of the number of virtual antennas regardless of the number of physical transmission antennas in the base station apparatus, for example.

Figure 7:
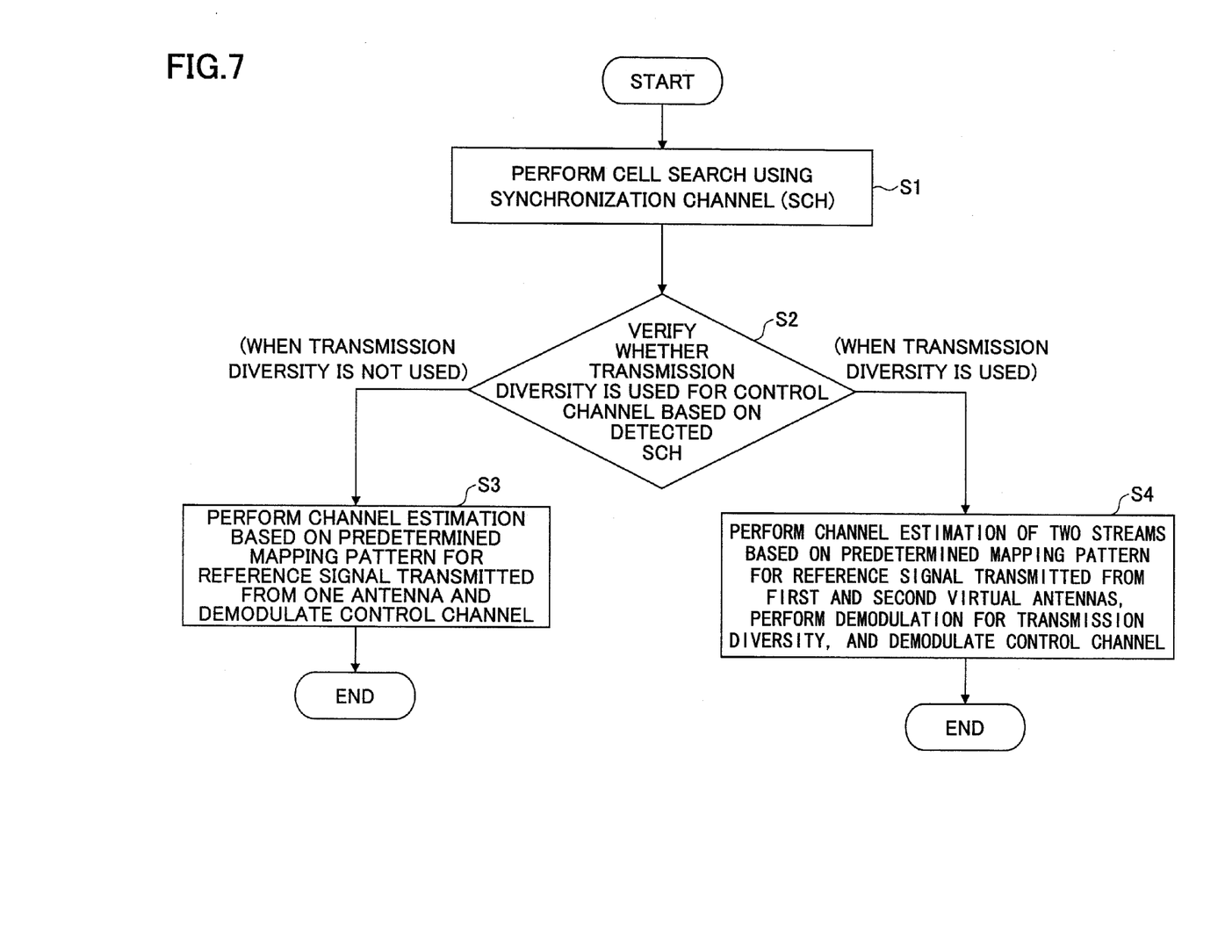
FIG. 7 shows a flowchart of exemplary operations according to an embodiment of the present invention.

FIG. 7 shows a flowchart of exemplary operations according to an embodiment of the present invention. At step S1, the user terminal performs cell search using the synchronization channel (SCH). Since the synchronization channel is transmitted from the base station apparatus with one virtual antenna, the user terminal can appropriately catch the synchronization channel regardless of the number of physical transmission antennas in the base station apparatus. By catching the synchronization channel, the user terminal identifies information such as a carrier frequency, reception timing, a spreading code (cell ID), and so on, and determines the cell to establish a connection.

At step S2, the user terminal verifies how the control channel is transmitted. Specifically, the user terminal verifies whether transmission diversity is used for transmission of the control channel, which scheme (CDD, FSTD, SFBC, etc.) is used when transmission diversity is used, and how many virtual antennas are used for the control channel. For example, these information items may be included in the spreading code used for the synchronization channel. When transmission diversity is not used, the method flow proceeds to step S3.

At step S3, channel estimation is performed based on a predetermined mapping pattern for the reference signal transmitted from one antenna. Then, the control channel is demodulated and the data channel or the like is demodulated. When transmission diversity is used at step S2, on the other hand, the method flow proceeds to step S4.

At step S4, channel estimation of two streams is performed based on a predetermined mapping pattern for the reference signals transmitted from first and second virtual antennas. Based on the estimation result, demodulation is performed corresponding to the used transmission diversity scheme and the control channel is derived. Then, the derived control channel is demodulated and the data channel or the like is demodulated if needed.

When the transmission diversity scheme is a CDD scheme, the control channel is transmitted with fixed delay between the first and second virtual antennas. When the amount of phase rotation in the frequency direction corresponding to the fixed delay is multiplied with the channel estimation value for the second virtual antenna which provides delay on the control channel and then is added to the channel estimation value for the first virtual antenna, the channel estimation value can be derived for the received signal, into which transmission signals transmitted on the control channel from the two virtual antennas according to the CDD scheme are combined. Using the channel estimation value, coherent detection is performed.

When the transmission diversity scheme is a FSTD scheme, signals on subcarriers are alternately transmitted from the first and second antennas according to a pattern which is known to the user terminal. For example, odd-numbered subcarriers may be transmitted from the first antenna and even-numbered subcarriers may be transmitted from the second antenna. Using the channel estimation value for the virtual antenna which is used for each subcarrier, coherent detection is performed.

When the transmission diversity scheme is a SFBC scheme, demodulation is performed according to the SFBC scheme using the channel estimation values for the first and second virtual antennas, and then coherent detection is performed.

It should be noted that the transmission diversity scheme is not limited to these schemes and any other scheme may be used. In any case, the synchronization channel, the reference signal, and the control channel are demodulated, and then the data channel is transmitted if needed.

Although the present invention is described above with reference to some embodiments, the embodiments are illustrative only and variations and modifications may be made without departing from the scope of the present invention. Although specific values are used in the embodiments to facilitate the understanding of the present invention, these values are just examples and different values may also be used unless otherwise mentioned. Although functional block diagrams are used to describe apparatuses in the embodiments, the apparatuses may be implemented by hardware, software, or a combination of them. The present invention is not limited to the specifically disclosed embodiments, and variations and modifications may be made without departing from the scope of the present invention.

This international application claims the benefit of the priority dates of Japanese Patent Application No. 2007-073727 filed on Mar. 20, 2007, the entire content of which is herein incorporated hereby by reference.

The invention claimed is:

1. A base station apparatus used in a mobile communication system where user terminals with various numbers of reception antennas may be situated, comprising:
   a providing unit configured to provide plural reference signals according to the number of transmission antennas;
   an adaptive precoding unit configured to replicate each of input signal sequences corresponding to the number of transmission streams, apply an adaptive precoding vector to each of the replicated sequences, and generate output signal sequences corresponding to the number of transmission antennas;
   a precoding unit configured to:
      replicate, according to the number of transmission antennas, each of a predetermined number of second input signal sequences, wherein at least one of the second input signal sequences includes a control signal, one of the plurality of reference signals, and one of the first output signal sequences,
      apply a predetermined precoding vector to each of the replicated second input signal sequences, and generate second output signal sequences corresponding to the number of transmission antennas; and a transmitting unit configured to transmit transmission signals including the second output signal sequences from plural of the transmission antennas.

2. The base station apparatus as claimed in claim 1, wherein:

one of the input signal sequences includes a synchronization channel.

3. The base station apparatus as claimed in claim 2, wherein:

the input signal sequences including the synchronization channel are selectively switched.

4. The base station apparatus as claimed in claim 1, further comprising:

a converting unit configured to convert one sequence of the control signal into at least two control signal sequences for transmission diversity; wherein at least two of the input signal sequences include one of the control signal sequences provided by the converting unit and one of the plural reference signals.

5. The base station apparatus as claimed in claim 1, wherein:

the adaptive precoding vector is adaptively updated according to a feedback signal from one of the user terminals.

6. A method used by a base station apparatus in a mobile communication system where user terminals with various numbers of reception antennas may be situated, comprising the steps of:

providing plural reference signals according to the number of transmission antennas;

replicating each of input signal sequences corresponding to the number of transmission streams according to the number of transmission antennas, applying an adaptive precoding vector to each of the replicated sequences, and generating output signal sequences corresponding to the number of transmission antennas;

replicating, according to the number of transmission antennas, each of a predetermined number of second input signal sequences, wherein at least one of the second input signal sequences includes a control signal, one of the plurality of reference signals, and one of the first output signal sequences, applying a predetermined precoding vector to each of the replicated second input signal sequences, and generating second output signal sequences corresponding to the number of transmission antennas; and transmitting transmission signals including the second output signal sequences from plural of the transmission antennas.

* * * * *